(No Model.) 2 Sheets—Sheet 1.

C. P. ELIESON.
ELECTRIC METER.

No. 443,642. Patented Dec. 30, 1890.

Witnesses. Inventor.

(No Model.)　　　　　　C. P. ELIESON.　　　2 Sheets—Sheet 2.
ELECTRIC METER.

No. 443,642.　　　　　　　　Patented Dec. 30, 1890.

Witnesses.　　　　　　　　　　　　　　　　　Inventor.

UNITED STATES PATENT OFFICE.

CHAIMSONOVITZ PROSPER ELIESON, OF LONDON, ENGLAND.

ELECTRIC METER.

SPECIFICATION forming part of Letters Patent No. 443,642, dated December 30, 1890.

Application filed March 18, 1890. Serial No. 344,417. (No model.)

*To all whom it may concern:*

Be it known that I, CHAIMSONOVITZ PROSPER ELIESON, a subject of the Queen of Great Britain, residing at London, England, have invented new and useful Improvements in and Connected with Electricity-Meters, of which the following is a specification.

My invention relates to improvements in electricity-meters of the kind in which the current to be measured is caused to electrolyze a body of water or other liquid, which is thereby decomposed in proportion to the quantity of current passing.

According to my invention I provide for ascertaining the quantity of current which has passed through such liquid either by metering the volume of gas generated or by registering the pulsations caused by the accumulation of the gas as it is generated, as hereinafter more particularly described.

In order to enable my invention to be fully understood, I will proceed to describe how it can be successfully carried into practice by reference to the accompanying drawings, in which—

Figure 1:
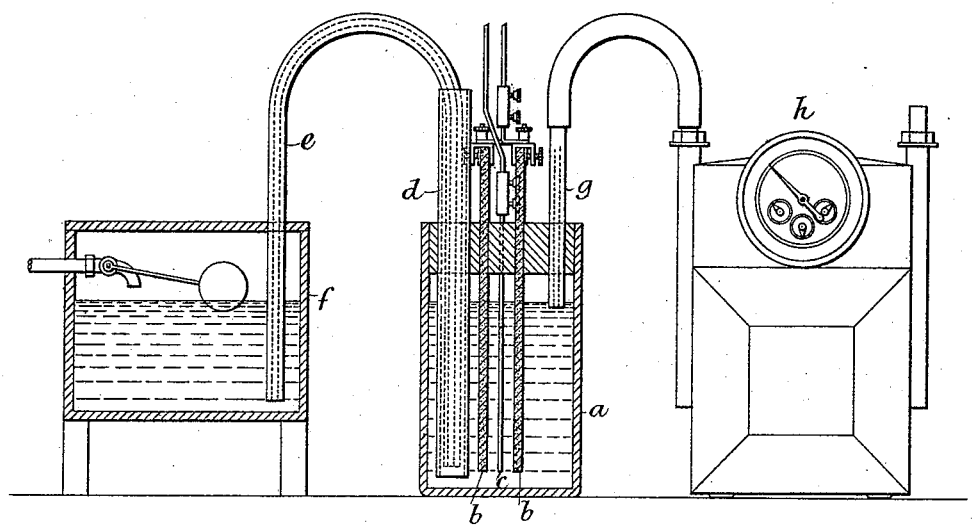
Figure 2:
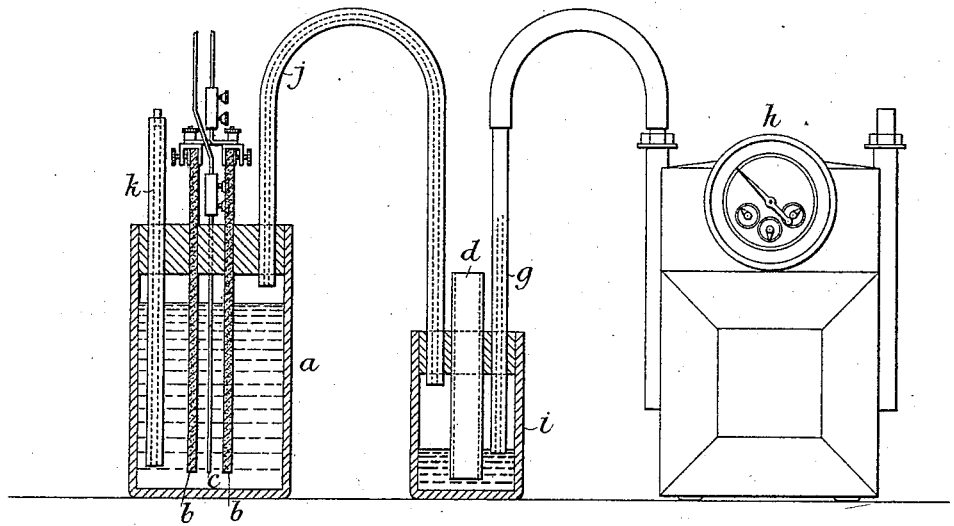
Figure 3:
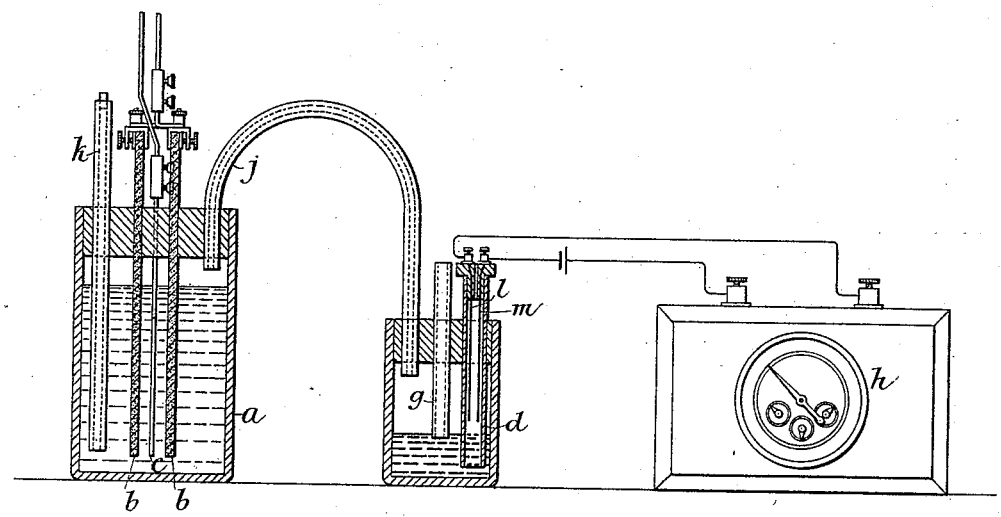

Figures 1 and 2 are sectional diagrammatic views showing two arrangements of my electricity-meters, in which the quantity of current is ascertained by metering the volume of gas generated; and Fig. 3 is a similar view to Figs. 1 and 2, but showing my arrangement for ascertaining the quantity of current by registering the pulsations caused by the accumulation of the gas as it is generated.

Similar letters in all the figures indicate similar parts.

I will first describe my invention by reference to Fig. 1, in which $a$ is a closed vessel containing the liquid, such as acidulated water, which is to be decomposed. $b$ and $c$ are suitable electrodes (say carbon for the negative and platinum for the positive electrode) placed in the said vessel and connected with the main conductors the current of electricity passing through which is to be measured, or the vessel may be placed in a shunt-circuit. $d$ is a tube which is open at both ends and inserted through the cover of the vessel $a$, the lower end of the tube extending near to the bottom of the vessel $a$, while the upper end of the tube extends, as shown, some distance above the top of the vessel. $e$ is a siphon, the long arm of which advantageously passes down the tube $d$, the other arm opening into a supply-cistern $f$, containing liquid kept at a constant level, the said siphon serving to maintain the level of the liquid in the closed vessel $a$ at its normal height. $g$ is a tube which also passes through the cover of the vessel $a$, the lower end of the tube extending just below the level of the liquid in the said vessel $a$ and the upper end of the tube communicating with any suitable meter, such as $h$. By this arrangement it will be obvious that as the electric current passes through the liquid in the vessel $a$ a portion of the said liquid, depending upon the quantity of the current, will be decomposed, and the gas thereby generated or liberated will collect in the upper part of the vessel and will displace the liquid and cause it to rise in the tubes $d$ and $g$ until the bottom of the tube $g$ becomes exposed, when the collected gas or gases will escape through the tube $g$ into the meter $h$ under the pressure of the column of liquid in the tube $d$. The gas having escaped and the pressure being thereby removed, the column of liquid in the tube $d$ will fall, and the liquid of the vessel $a$ thereby resuming its normal level will again close the lower end of the tube $g$, and so on, the quantity of gas generated being measured as it passes through the meter $h$, thereby indicating the exact equivalent of the current which has passed through the vessel $a$.

It will be obvious that the dial of the meter can be so graduated or divided as to give direct reading in ampère-hours or otherwise.

In the arrangement of meter shown in Fig. 2 the principle of working is substantially the same as that shown in Fig. 1; but in this arrangement I dispense with the cistern $f$ and place between the vessel $a$ and the meter $h$ a small vessel $i$, containing mercury. In this case the tubes $d$ and $g$ are inserted in the mercury-vessel $i$, which vessel is also connected with the vessel $a$ in any suitable manner, such as by means of a tube $j$. $k$ is a tube through which the vessel $a$ is supplied with liquid, the said tube being closed at the upper end. By this arrangement it will be readily understood that the gas generated by the electrolysis or decomposition of the liquid in the vessel $a$ will pass through the tube $j$ into the vessel $i$, causing the mercury to rise in the tubes $d$ and $g$ similarly as the liquid in the vessel $a$ rose in Fig. 1, and as soon as the lower end of the tube $g$ is exposed the gas will escape through the tube $g$ into the meter, as before described in reference to Fig. 1, thereby enabling me to keep the gases under a constant and equable pressure without the necessity of maintaining constant the level of the liquid in the vessel $a$.

I will now describe the meter illustrated in Fig. 3. This meter is practically identical with that illustrated in Fig. 2, except that instead of the gases generated escaping through the tube $g$ into a meter they are now allowed to escape freely through the said tube; but as the mercury rises in the tube $d$ it completes an electric circuit by means of two suitable wires $l\,m$ in the tube $d$, so as to short-circuit an electric magnet which actuates a counter $h$. Directly the gases escape the mercury falls, as before, thereby breaking the circuit, and so on continuously, whereby each pulsation caused by the accumulation of the gas or gases generated is registered.

For measuring alternating currents it will be obvious that one or both of the electrodes must be made relatively small and of suitable material, such as platinum. Where a current of electricity of a certain quantity is to be measured—that is to say, a current not below a minimum required for, say, supplying a few glow-lamps—then the gas generated need not be compressed, but can pass direct to the meter.

Having now particularly described and ascertained the nature of my said invention and in what manner the same is to be performed, I declare that what I claim is—

1. An electricity-meter having in combination a closed vessel containing liquid through which the current to be measured passes, a vessel having provision for maintaining a liquid at a constant level therein and for feeding said closed vessel, and a register having connections with said closed vessel, as described, substantially as and for the purposes set forth.

2. An electricity-meter serving to register the number of pulsations caused by the accumulation of gas generated by electrolysis of a liquid, having, in combination with a vessel $a$ containing liquid through which the current passes, and with an indicator or counter, an intermediate mercury-vessel suitably connected to the vessel $a$ and to such indicator and provided with an escape-tube, all substantially as set forth.

3. In an electric meter, the combination, with a closed vessel containing liquid through which the current or any fraction thereof passes, of an inlet-tube for the liquid and an outlet-tube for the gas generated, a mercury-vessel connected to said outlet-tube, and an electric indicator or counter connected to said mercury-vessel, whereby the pulsations caused by the accumulation of gas generated by the electrolysis of the liquid are registered, substantially as set forth.

4. An electricity-meter having between the indicator and the vessel containing the liquid and electrodes an intermediate vessel or cup containing a mercurial trap which permits the flow or escape of gases at intervals only when a definite pressure has been attained.

CHAIMSONOVITZ PROSPER ELIESON.

Witnesses:
G. J. REDFERN,
A. ALBUTT.